US008287356B2

(12) United States Patent
Rood

(10) Patent No.: US 8,287,356 B2
(45) Date of Patent: Oct. 16, 2012

(54) METHOD OF GAMING, A GAMING SYSTEM AND A GAME CONTROLLER

(75) Inventor: Steven Rood, Henderson, NV (US)

(73) Assignee: Aristocrat Technologies Australia Pty Limited (AU)

( * ) Notice: Subject to any disclaimer, the term of this patent is extended or adjusted under 35 U.S.C. 154(b) by 463 days.

(21) Appl. No.: 12/390,134

(22) Filed: Feb. 20, 2009

(65) Prior Publication Data

US 2009/0239637 A1 Sep. 24, 2009

Related U.S. Application Data

(60) Provisional application No. 61/030,123, filed on Feb. 20, 2008.

(51) Int. Cl.
*A63F 13/00* (2006.01)

(52) U.S. Cl. ............................... 463/20; 463/17; 463/30

(58) Field of Classification Search .................... 463/20, 463/17, 30
See application file for complete search history.

(56) References Cited

U.S. PATENT DOCUMENTS

| | | | | |
|---|---|---|---|---|
| 5,489,101 | A | 2/1996 | Moody | |
| 5,531,448 | A | 7/1996 | Moody | |
| 5,630,753 | A | 5/1997 | Fuchs | |
| 5,851,147 | A | 12/1998 | Stupak et al. | |
| 6,126,541 | A | 10/2000 | Fuchs | |
| 6,461,241 | B1 | 10/2002 | Webb et al. | |
| 6,551,187 | B1 | 4/2003 | Jaffe | |
| 6,869,076 | B1 | 3/2005 | Moore et al. | |
| 7,351,144 | B2 | 4/2008 | Daly | |
| 7,690,985 | B1 | 4/2010 | Muskin et al. | |
| 2003/0036422 | A1 * | 2/2003 | Baerlocher et al. | 463/20 |
| 2003/0130023 | A1 | 7/2003 | Angel | |
| 2003/0153384 | A1 | 8/2003 | Duhamel | |
| 2003/0207707 | A1 | 11/2003 | Slomiany et al. | |
| 2003/0222400 | A1 | 12/2003 | Collins et al. | |
| 2004/0014517 | A1 * | 1/2004 | Inoue | 463/20 |
| 2005/0014557 | A1 | 1/2005 | Duhamel | |
| 2005/0059469 | A1 | 3/2005 | Gail et al. | |
| 2005/0064933 | A1 | 3/2005 | Davis | |
| 2005/0250578 | A1 | 11/2005 | Slomiany et al. | |
| 2006/0119042 | A1 | 6/2006 | Schreiner | |
| 2006/0183535 | A1 * | 8/2006 | Marks et al. | 463/20 |
| 2007/0032286 | A1 | 2/2007 | Muir | |
| 2007/0032290 | A1 | 2/2007 | Saito et al. | |
| 2007/0099690 | A1 | 5/2007 | Nozaki | |
| 2007/0238518 | A1 | 10/2007 | Osawa | |

FOREIGN PATENT DOCUMENTS

| | | |
|---|---|---|
| CA | 2508080 | 12/2006 |
| DE | 10127532 | 12/2002 |
| DE | 10342687 | 4/2005 |
| EP | 1378872 | 1/2004 |

(Continued)

*Primary Examiner* — Ronald Laneau
*Assistant Examiner* — Wilner Jean Baptiste
(74) *Attorney, Agent, or Firm* — McAndrews, Held & Malloy, Ltd.

(57) ABSTRACT

A method of gaming comprising: selecting a set of symbols for display to a player in a set of display positions corresponding to respective ones of a plurality of reels; determining a game round outcome based on the selected symbols; determining that a feature game round should occur; and determining a feature game round outcome by determining an optimal winning combination of symbols from a feature subset of the set of symbols comprising more symbols than the number of reels.

11 Claims, 8 Drawing Sheets

FOREIGN PATENT DOCUMENTS

| | | |
|---|---|---|
| GB | 2135490 | 8/1984 |
| GB | 2335524 | 9/1999 |
| GB | 2402080 | 12/2004 |
| GB | 2416902 | 2/2006 |
| WO | 0163573 | 8/2001 |
| WO | 0189644 | 11/2001 |

* cited by examiner

| | | | | | |
|---|---|---|---|---|---|
| 9 | 9 | A | 10 | K | 810a |
| J | K | 9 | K | 10 | 810b |
| Q | J | K | A | K | 810c |
| 820a | 820b | 820c | 820d | 820e | |

Figure 8A

| | | | | |
|---|---|---|---|---|
| 9 | 9 | A | 10 | 10 |
| K | K | K | K | K |
| Q | J | J | A | 9 |

Figure 8B

METHOD OF GAMING, A GAMING SYSTEM AND A GAME CONTROLLER

RELATED APPLICATIONS

This application claims priority to U.S. Provisional Patent Application No. 61/030,123, having a filing date of Feb. 20, 2008, which is incorporated herein by reference in its entirety.

BACKGROUND OF THE INVENTION

The present invention relates to a method of gaming, a gaming system and a game controller.

Gaming systems are known comprising a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine with selected symbols are displayed in virtual reels on a video display.

Feature game rounds are known where on a trigger event, a special game round occurs with modified rules or reel behaviors.

While such added features provide users with enjoyment, there is a need for alternative gaming systems and methods with different type of feature game rounds to add to player excitement.

BRIEF SUMMARY OF THE INVENTION

According to a first aspect of the invention there is provided a method of gaming comprising:

selecting a set of symbols for display to a player in a set of display positions corresponding to respective ones of a plurality of reels;

determining a game round outcome based on the selected symbols;

determining that a feature game round should occur; and determining a feature game round outcome by determining an optimal winning combination of symbols from a feature subset of the set of symbols comprising more symbols than the number of reels.

In an embodiment, the method comprises the step of reassigning the display positions corresponding to each symbol in the optimal winning combination so that the optimal winning combination is displayed in a win line extending across the reels.

In an embodiment, the feature subset is all of the set of symbols in the display positions.

In an embodiment, the feature subset includes at least one symbol from each reel.

In an embodiment, the feature subset is adjustable.

In an embodiment, the optimal winning combination for the feature game round is a combination of symbols from the feature subset that corresponds to the highest prize according to prize data for the game round.

In an embodiment, the optimal winning combination for the feature game round is a combination of symbols from the feature subset that corresponds to the highest prize according to prize data different from prize data for the game round.

In an embodiment, the feature game round outcome and the game round outcome are based on identical prize data.

In an embodiment, the step of determining that a feature game round should occur is made on the basis of a random event.

In an embodiment, the step of determining that a feature game round should occur is made on the basis of player choice.

In an embodiment, the step of selecting symbols comprises selecting stopping positions for the reels relative to the display positions.

In an embodiment, the steps of selecting symbols, determining a game round outcome, determining that a feature game round should occur, and determining a feature game round are carried out by a game controller.

According to a second aspect of the invention, there is provided gaming system comprising:

a display for symbols to be displayed in a set of display positions to a player corresponding to respective ones of a plurality of reels;

a symbol selector for selecting a set of symbols for display in the set of display positions;

a game round outcome determiner for determining a game round outcome based on the selected set of symbols.

a feature game round controller for determining whether a feature game round should occur; and a feature game round outcome determiner for determining a feature game round outcome based on an optimal winning combination of symbols from a feature subset of the set of symbols for display comprising more symbols than the number of reels.

In an embodiment, the gaming system is adapted to reassign the display positions corresponding to each symbol in the optimal winning combination so that the optimal winning combination is displayed in a line extending across the reels in the feature game round.

In an embodiment, the feature subset is all of the set of symbols in the display positions.

In an embodiment, the feature subset includes at least one symbol from each reel.

In an embodiment, the feature subset is adjustable.

In an embodiment, the optimal winning combination is a combination of symbols from the feature subset that corresponds to the highest prize according to prize data for the game round.

In an embodiment, the optimal winning combination is a combination of symbols from the feature subset that corresponds to the highest prize according to prize data different from prize data for the game round.

In an embodiment, the feature game round outcome and the game round outcome are based on identical prize data.

In an embodiment, the feature game round controllers determines that a feature game round should occur on the basis of a random event.

In an embodiment, wherein the feature game round controller determines that a feature game round should occur on the basis of player choice.

In an embodiment, one or more of the symbol selector, the game round outcome determiner, the feature game round controller and the feature game round outcome determiner is implemented by a game controller comprising a processor executing program code from a memory.

In an embodiment, the gaming system comprises a game play mechanism operable by a player to place a wager, and wherein the game round outcome determiner determines the game round outcome based on the wager.

According to a third aspect of the invention, there is provided a game controller comprising:

a symbol selector for selecting a set of symbols for display to a player on in a set of display positions corresponding to respective ones of a plurality of reels;

a game round outcome determiner for determining a game round outcome based on the selected set of symbols;

a feature game round controller for determining whether a feature game round should occur; and a feature game round outcome determiner for determining a feature game round outcome based on an optimal winning combination of symbols from a feature subset of the set of symbols for display comprising more symbols than the number of reels.

In an embodiment, the game controller is adapted to re-assign the display positions corresponding to each symbol in the optimal winning combination so that the optimal winning combination is displayed in a win line extending across the reels in the feature game round.

In an embodiment, the feature subset is all of the set of symbols for display.

In an embodiment, the feature subset includes at least one symbol from each reel.

In an embodiment, the feature subset is adjustable.

In an embodiment, the optimal winning combination is a combination of symbols from the feature subset that corresponds to the highest prize according to prize data for the game round.

In an embodiment, the optimal winning combination is a combination of symbols from the feature subset that corresponds to the highest prize according to prize data different from prize data for the game round.

In an embodiment, the feature game round outcome and the game round outcome are based on identical prize data.

In an embodiment, the feature game round controllers determines that a feature game round should occur on the basis of a random event.

In an embodiment, the feature game round controller determines that a feature game round should occur on the basis of player choice.

According to a fourth aspect of the invention there is provided computer program code when executed by a computer causes the computer to implement any of the embodiments of the method of gaming of the first aspect of the invention.

According to a fifth aspect of the invention there is provided a computer readable medium comprising the program code of the fourth aspect of the invention.

According to a sixth aspect of the invention there is provided a data signal comprising the computer program code of the fourth aspect of the invention.

According to a seventh aspect, the invention extends to transmitting the computer program code.

BRIEF DESCRIPTION OF SEVERAL VIEWS OF THE DRAWINGS

Exemplary embodiments of the invention are described by way of non-limiting example in relation to drawing in which:

FIGS. 8A and 8B show the displays of Example 1; and

DETAILED DESCRIPTION OF THE INVENTION

Figure 1:
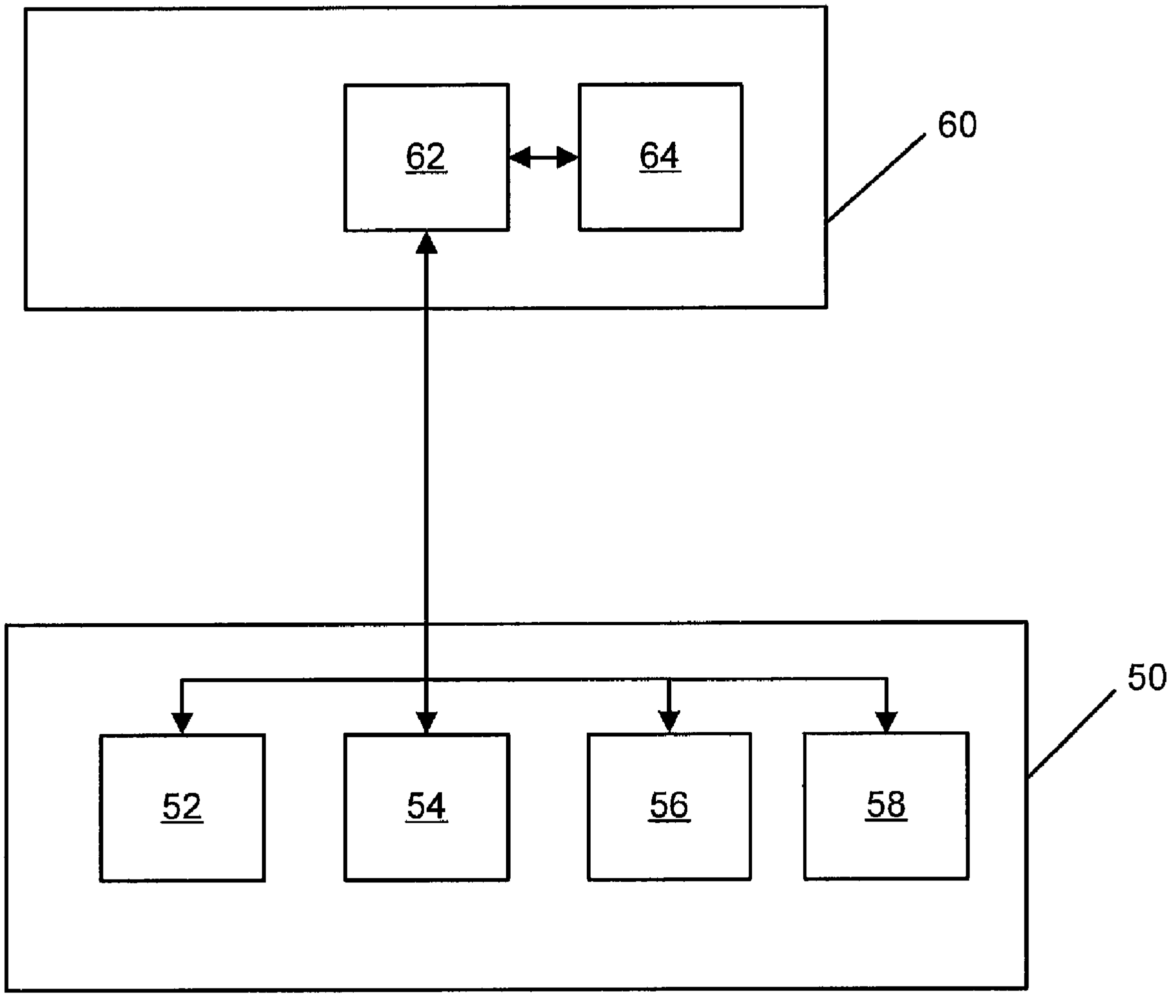
FIG. 1 is a block diagram of the core components of a gaming system.

Referring to the drawings, there is shown a gaming system having a game controller arranged to implement a spinning reel game having a feature game round wherein an optimal winning combination is derived from symbols of a set of display positions greater than the number of reels.

The gaming system may take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 comprising one or more input devices that enable a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
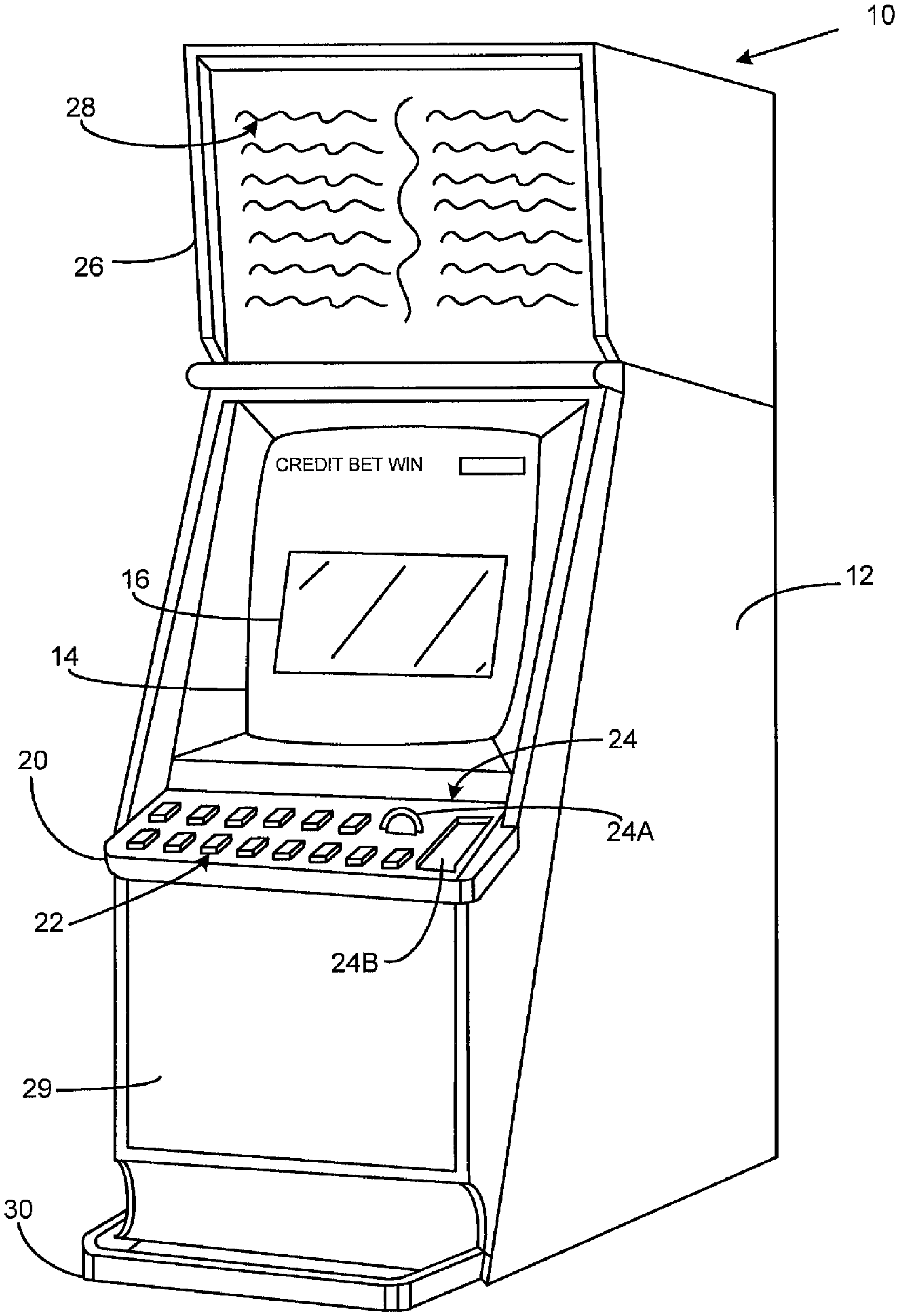
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
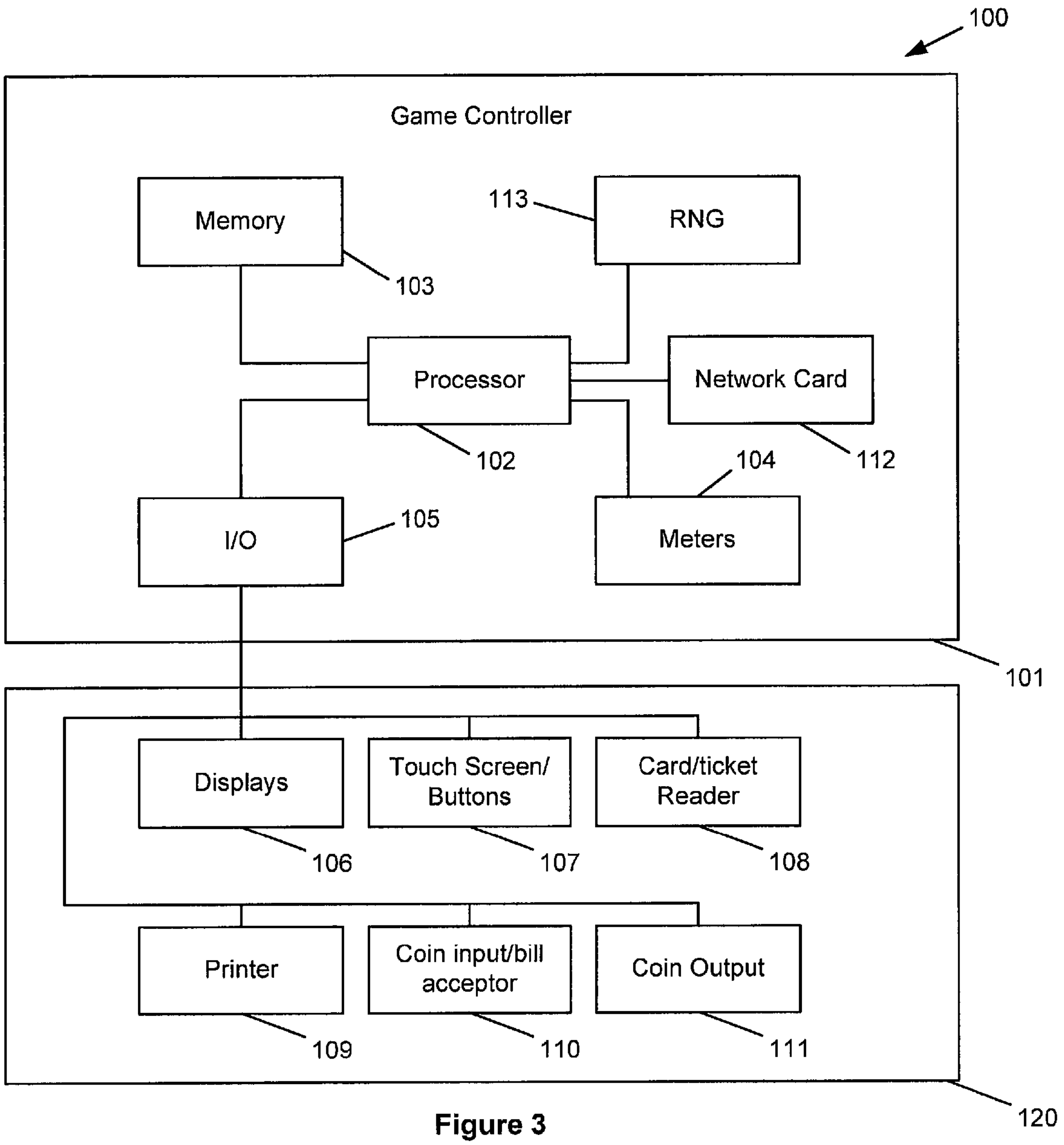
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while a touch screen and/or buttons are common input devices for gaming machines, other input devices can be employed to interact with the game—e.g. a mechanical arm can be used to start a play of the machine.

In addition, the gaming machine 100 may include a communications interface, for example a network card 112. The network card may, for example, send status information, accounting information or other information to a central controller, server or database and receive data or commands from the central controller, server or database.

Figure 4:
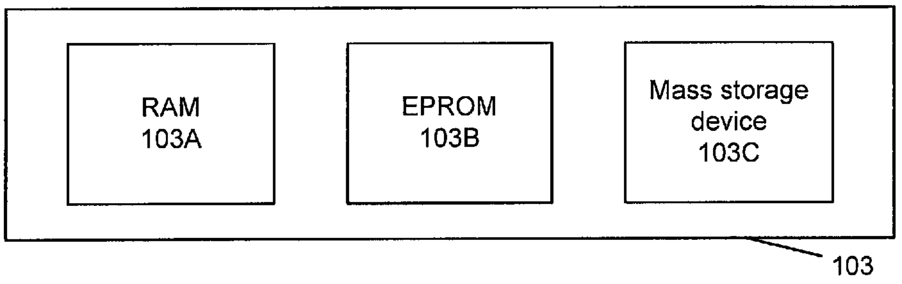
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
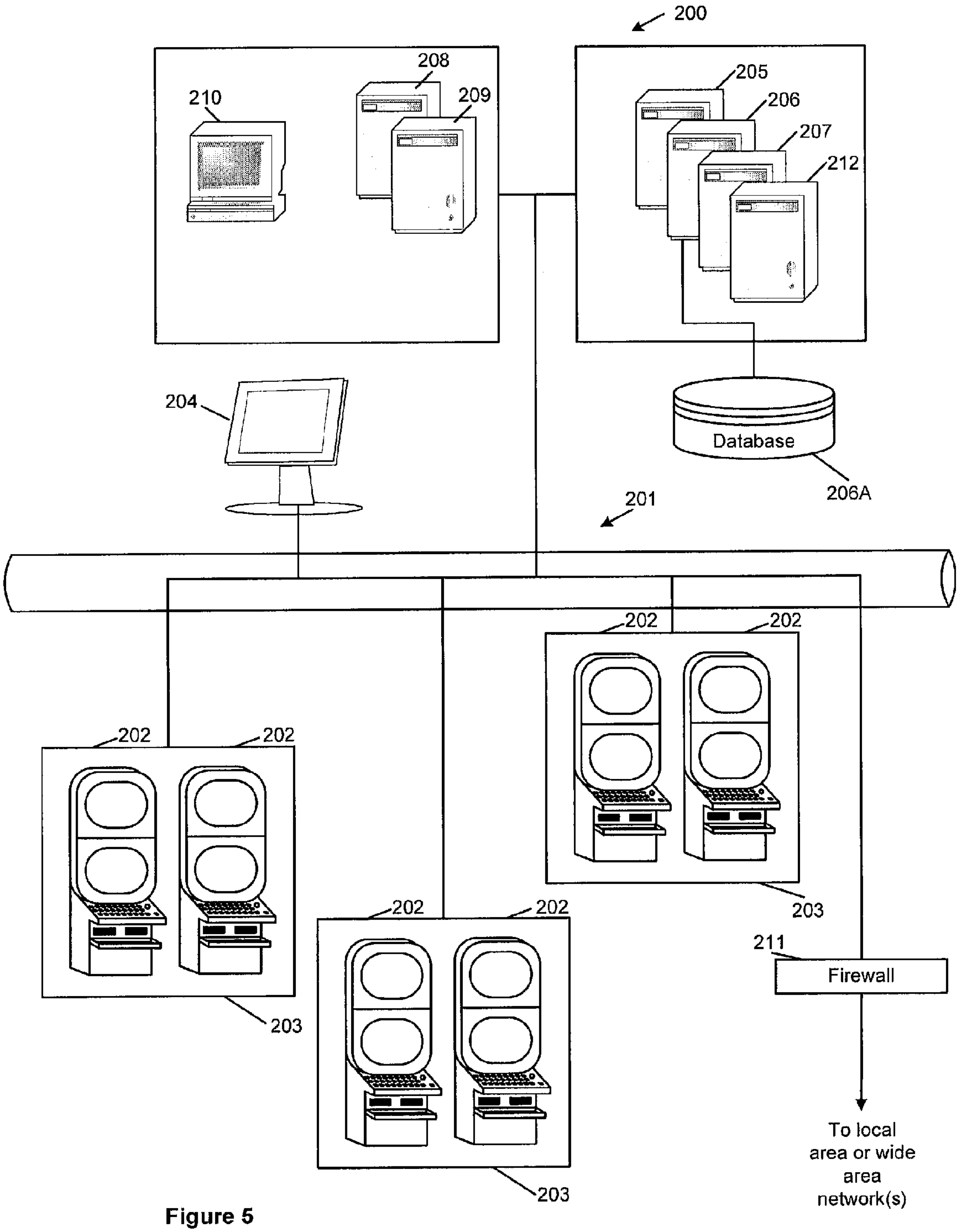
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Embodiments of the invention relate to gaming systems for implementing games that involve a display of spinning reels as part of the display of the outcome of the game.

The game controllers of such gaming systems have a stop determining function that determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" of display positions corresponding to a "single win line" game. When a reel stops, the symbols will be in one of a plurality of possible symbol positions for that reel relative to the stop position. The display positions are those positions which are used in evaluation of the game outcome.

Exemplary embodiments of the present invention relate to gaming systems that allow a player to select, in non-feature games, how many win lines of a plurality of win lines they will play in each game—i.e. a minimum of one win line up to the maximum number of win lines allowed by the game. Each win line is formed by a set of symbol positions consisting of one symbol display position from each reel. That is, a predetermined symbol position of each reel is assigned to a win line. The symbol positions that constitute each of the win lines are usually advertised to the player by markings on the display or diagrams showing the symbol display positions that correspond to each win line.

Figure 6:
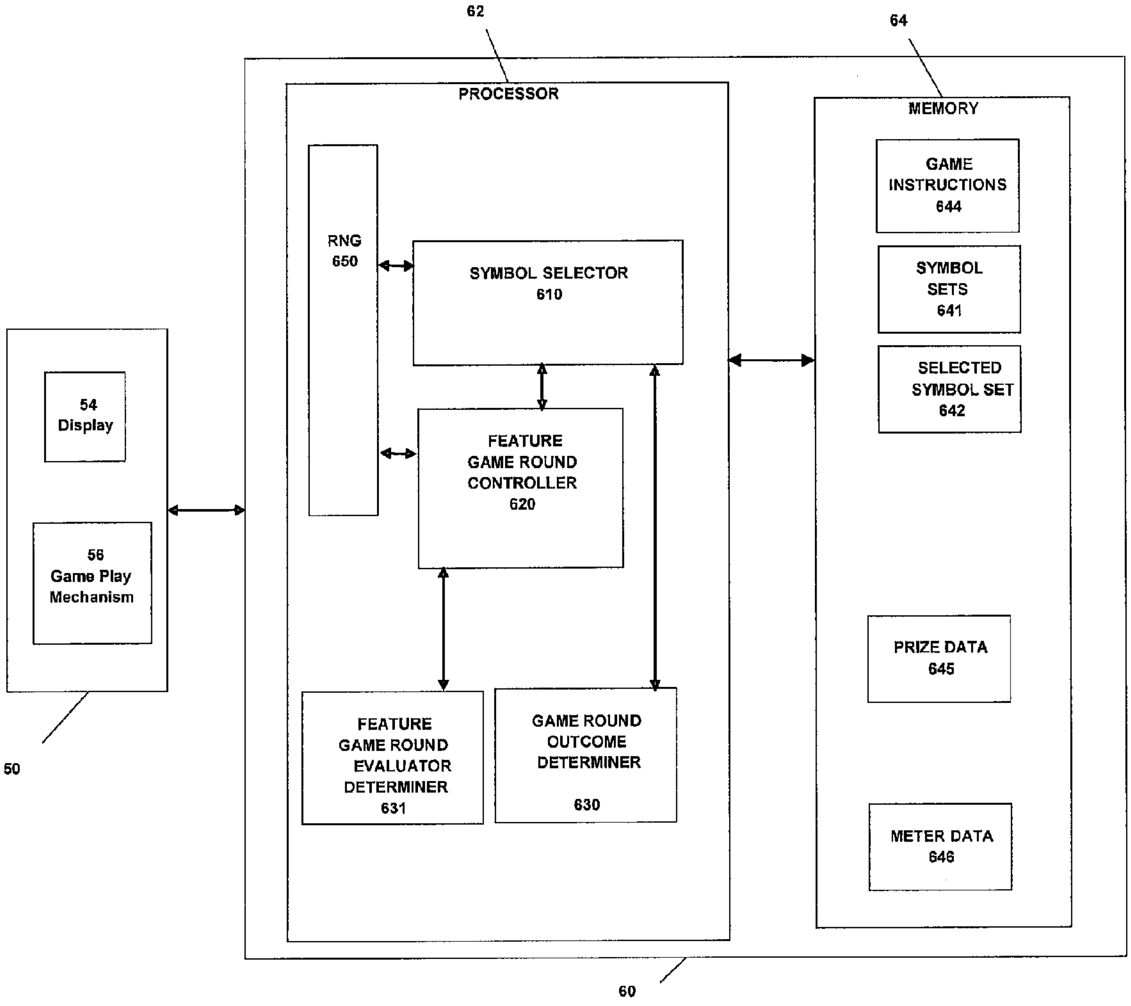
FIG. 6 is a further block diagram of the gaming system.

The game controller of one embodiment is shown in more detail in FIG. 6. The game controller 60 incorporates a processor 62 which implements a symbol selector 610, random number generator 650, feature game controller 620 game round outcome determiner 630 and a feature game round outcome determiner 631 based on program code stored in memory 64. Memory 64 comprises game instructions 644, symbol sets 641, prize data 645, which contains the prize data for both the game round and the feature game round, and meter data 646. Persons skilled in the art will appreciate that one or more of these components could be provided in other ways, for example by a dedicated circuit.

In an example of a game to which the embodiment is applied, in response to placement of a wager and initiation of the game with the game play mechanism, symbol selector 610 selects symbols for display in the set of display positions to be used in evaluating the game outcome using random number generator 650 a stop determining function as described above. The symbols are selected from symbol sets 641 which define the symbols for each reel, and updates selected symbol set data 642 with the selected set of symbols and displays the set of symbols in their assigned display positions on the display 54. In a game round, game round outcome determiner 630 determines a game round outcome based on the manner of evaluation (e.g. based on the win lines specified as part of the wager) using prize data 645 and then updates meter data 646. In response to feature game round controller 620 determining that a feature game round should occur, which could be on the basis of a random event, feature game controller 620 selects a feature subset of the symbols for display (as stored as selected symbol set data), larger in size than the number of reels. The subset may be non-adjustable and may, in one embodiment, be the entire set of symbols for display (such that it doesn't require selection). Feature game round outcome determiner 630 then identifies the optimal winning combination of symbols that can be formed from the feature subset from prize data 645, which may or may not be the same for the feature game round and game round. Restrictions may be placed on the formation of the optimal winning combination, such as requiring one symbol from each reel.

The feature game round outcome determiner 631 then updates meter data 645, and displays any win on display 54 on the player interface 50. Part of the step of displaying the win may be to display the symbols with highlights, to move them to a win line in a new part of the screen or to rearrange the symbols for display so that the winning combination appears on a win line appropriate to a non-feature game round outcome.

Figure 7:
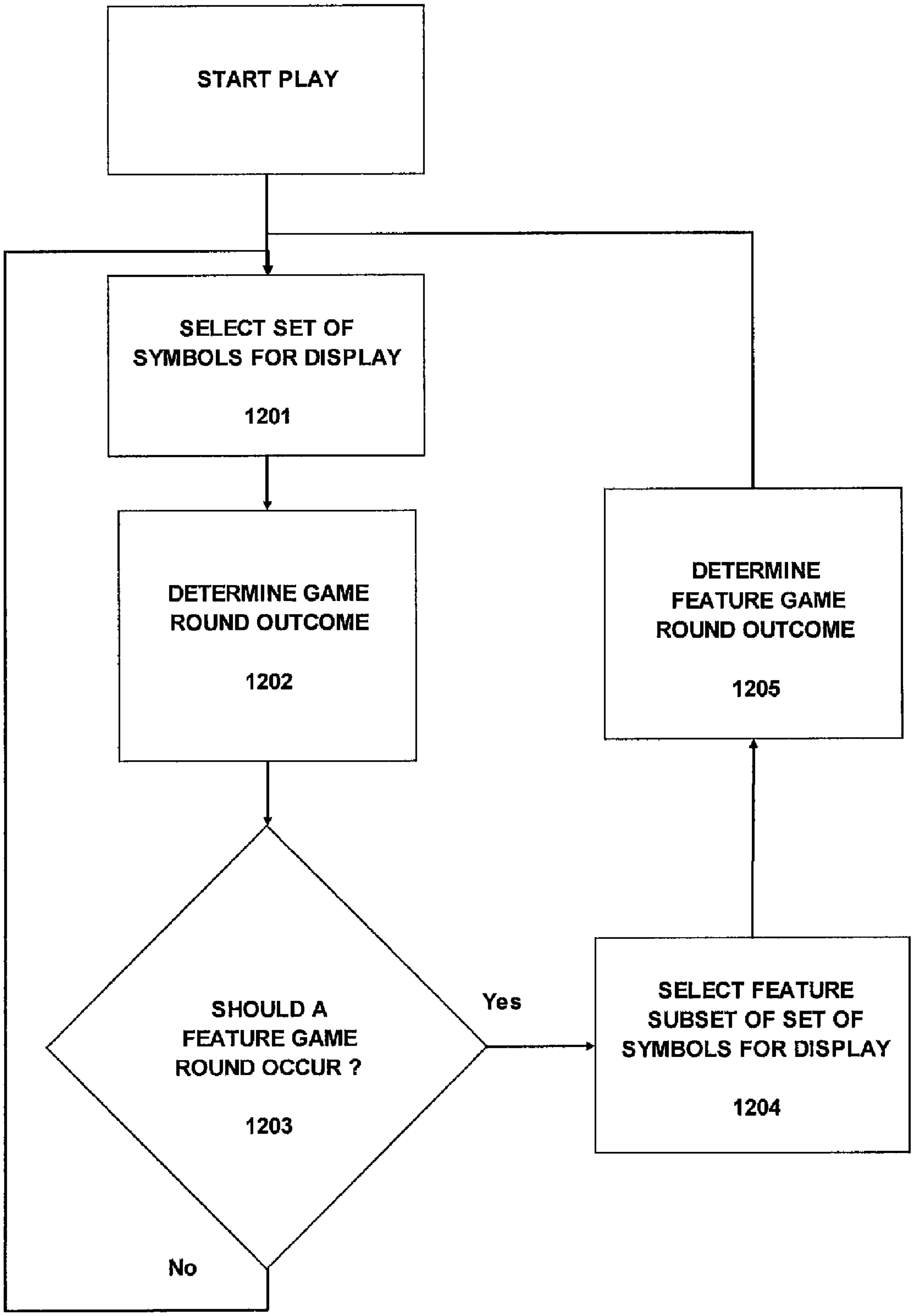
FIG. 7 shows a flow diagram for the method of an embodiment of the invention.

Now referring to FIG. 7, a flow diagram for an embodiment of the invention is shown. At the start of a game round, in step 1201 symbol selector 610 selects the symbols for display in the display positions for a game round. Game round outcome determiner 630 in step 1202 processes the symbols lying on the win lines in step to calculate a game round outcome from prize data 645, then updates meter data 646.

In step 1203 feature game round controller 620 determines whether a feature game round should now occur. If the answer in step 1202 is "yes", feature game round outcome determiner 631 selects in step 1204 a feature subset of the selected symbol set, which may be non-adjustable, such as all of the selected symbol set, or may be adjustable such as by player choice or random event or based on an amount bet. The feature subset is unlike a win line, having more elements than the number of reels. From among the feature subset of symbols, in step 1205 feature game round outcome determiner 631 determines an optimal winning combination using prize data 645, and updates meter data 646 by paying the prize. Accordingly, the optimal winning combination is determined irrespective of the initial position of the symbols relative to win lines.

Persons skilled in the art will appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

EXAMPLE 1

Now referring to FIGS. 8A and 8B, an example of one embodiment of the method of the invention is shown.

FIG. 8A shows the set of symbols for display in their respective display positions after selection for a game round. The display positions are arranged as a set of reels 820*a* to 820*e* showing three reel positions on each reel in the "top" 810*a*, "centre" 810*b* and "bottom" 810*c* positions. A game round outcome has been determined by game round outcome determiner 630 from the set of symbols for display using a win line as the centre reel position line 810*b* prize data 645 as no win, the centre combination "J K 9 K 10" having no winning combinations.

In this embodiment a random event, in the form of a random trial with probability of 1 in 100, now causes feature game round controller 620 to determine that a feature game round shall occur. Feature game round outcome generate 631 processes the feature subset, which in this embodiment is always the whole set of symbols for display. Feature game outcome determiner 931 now determines whether there are any winning combinations from the feature subset of fifteen symbols, and identifies the optimal winning combination as the most valuable winning combination using prize data 645 as 5 Kings in a row. Feature game round outcome determiner determines the prize for 5 Kings from prize data 645, which in this embodiment is the same prize for 5 Kings as in a game round, and updates meter data 646.

FIG. 8B shows the optimal winning combination displayed to the player by a rearrangement of the set of symbols for display so that the five Kings occupy the non-feature game round win-line, the centre line 810*b*. The optimal winning combination can of course be displayed in any of a number of alternative ways.

EXAMPLE 2

Figure 9A:
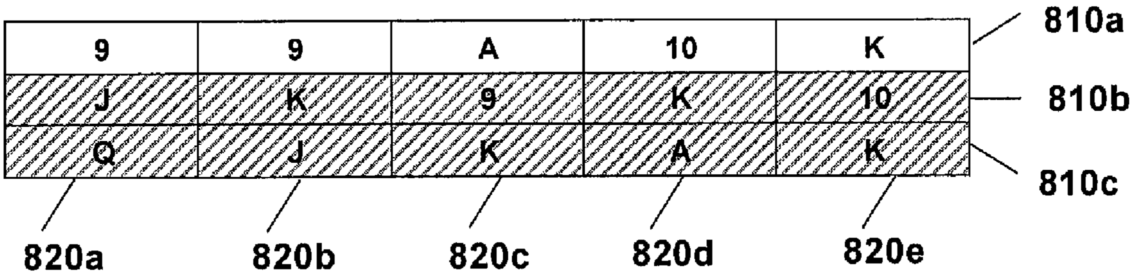
FIGS. 9A and 9B show displays of Example 2.
Figure 9B:
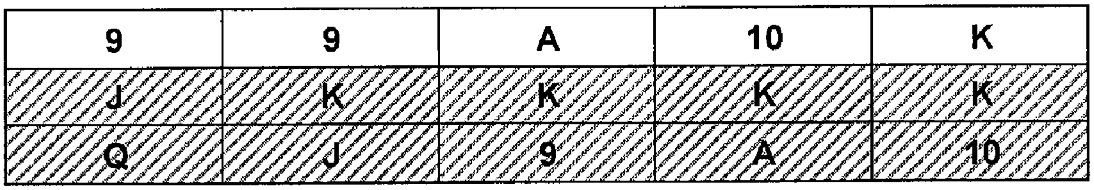

Now referring to FIGS. 9A and 9B, an example of another embodiment is shown. In this embodiment, the same non-feature game round display as in example 1 is shown, and like example 1 a random event has caused feature game round controller 620 to determine that a feature game round shall occur. Feature game round outcome determiner 631 then selects the feature subset, which unlike the embodiment of example 1 is based on a player choice and is selected by the player as the centre and bottom rows 810*b* and 810*c*. This is shown as the hatched region in FIG. 9A. Feature game round outcome determiner 931 now determines whether there are any winning combinations from the feature subset of ten symbols, and identifies the optimal winning combination using prize data 645 as four Kings.

FIG. 9B shows the optimal winning combination displayed to the player again in this embodiment by a rearrangement of the set of symbols for display similar to that of example 1 so that the four Kings occupy the non-feature game round win-line, the centre line 810*b*.

Persons skilled in the art will also appreciate that many variations may be made to the invention without departing from the scope of the invention including by forming further embodiments from the features described herein.

In one variation, alternative trigger events known in the art may be used to determine that a feature game round should occur, such as a particular symbol or symbol combination or an external trigger from a connected controller. In other embodiments, entitlement to the feature may be purchased and/or eligibility criteria might be applied for there to be an evaluation of whether the feature game should occur.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A gaming system comprising:

a gaming machine having a display for symbols to be displayed in a set of display positions to a player corresponding to respective ones of a plurality of reels;

a symbol selector, including an electronic random number generator, for selecting a set of symbols for display in the set of display positions;

a game round outcome controller for determining a game round outcome during a main game round based on the selected set of symbols;

a feature game round controller configured to:

determine whether a feature game round should occur at the gaming machine independent of the symbols selected for display in the main game round;

determine a feature subset of symbols selected from the set of symbols selected for display in the main game round, the feature subset comprising more symbols than the number of reels displayed on the gaming machine; and determine a feature game round outcome by automatically rearranging the feature subset of symbols into an optimal winning combination to define at least one predetermined winning combination, wherein the at least one predetermined winning combination is selected from one or more predetermined winning combinations available in the main game round.

2. A gaming system as claimed in claim 1, wherein the feature game controller is adapted to re-assign the display positions corresponding to each symbol in the optimal winning combination so that the optimal winning combination is displayed in a line extending across the reels in the feature game round.

3. A gaming system as claimed in claim 1 wherein the feature subset is all of the set of symbols in the display positions.

4. A gaming system as claimed in claim 1 wherein the feature subset includes at least one symbol from each reel.

5. A gaming system as claimed in claim 1 wherein the feature subset is adjustable.

6. A gaming system as claimed in claim 1 wherein the optimal winning combination is a combination of symbols from the feature subset that corresponds to the highest prize according to prize data for the game round.

7. A gaming system as claimed in claim 1 wherein the optimal winning combination is a combination of symbols from the feature subset that corresponds to the highest prize according to prize data different from prize data for the game round.

8. A gaming system as claimed in claim 7 wherein the feature game round outcome and the game round outcome are based on identical prize data.

9. A gaming system as claimed in claim 1 wherein the feature game round controllers determines that a feature game round should occur on the basis of a random event.

10. A gaming system as claimed in claim 1 wherein the feature game round controller determines that a feature game round should occur on the basis of player choice.

11. A gaming system as claimed in claim 1 comprising a game play mechanism operable by a player to place a wager, and wherein the feature game round controller determines the game round outcome based on the wager.

* * * * *